Patented May 18, 1948

2,441,842

UNITED STATES PATENT OFFICE 2,441,842

WAX EMULSION

Leon M. Prince, Jr., New York, N. Y.

No Drawing. Application August 24, 1944,
Serial No. 551,065

5 Claims. (Cl. 106—8)

This invention relates to aqueous wax suspensions or emulsions and more particularly to improved Uricury wax emulsions of a type adapted to be incorporated in a self-lustering polish, that is, a polish which when applied to a surface such as wood, linoleum, leather, etc., or used as a coating for fruits or vegetables will dry to give a finish which is lustrous and glossy without buffing or rubbing.

Heretofore self-lustering polishes have for the most part been prepared from emulsions of carnauba wax such as, for example, the emulsion disclosed in Patent 2,045,455 issued to George W. Flint. However, carnauba wax is relatively expensive and is frequently difficult to obtain since its production depends upon seasonal weather conditions in the regions of Brazil from which it is obtained. Uricury wax, on the other hand, is normally more readily available and less expensive than carnauba wax but is a relatively difficult material to emulsify. Uricury, which is also known as Ouricury or Licuri wax, has physical and chemical properties that are very similar to those of carnauba wax and hence is potentially a useful substitute for carnauba. Thus both Uricury and carnauba possess a considerable degree of hardness, a property which is particularly important in the case of waxes which are to be incorporated in floor polishes.

Because Uricury wax is difficultly emulsifiable it cannot in many cases be effectively substituted for carnauba in the formulae and procedures previously proposed for the production of carnauba wax emulsions. Some of the shortcomings of Uricury wax when emulsified in the conventional manner for carnauba wax are that it forms an excessively viscous emulsion having a particle size much larger than that of the corresponding carnauba emulsion and that the stability of a Uricury emulsion is uncertain and extends over a much shorter period of time than a corresponding emulsion made with carnauba wax, the Uricury emulsion tending to separate into two layers, a lower almost translucent layer and an upper non-homogeneous one. In general a much stronger alkaline emulsifying agent or a greater concentration of a relatively weaker alkaline emulsifying agent such as triethanolamine, must be used with Uricury wax in order to obtain an emulsion whose properties are at all comparable with those of an emulsion made with carnauba wax. Furthermore the spreading properties of a Uricury wax emulsion when incorporated into a polish are usually inferior to those of a carnauba emulsion.

It is an object of the present invention to provide a Uricury wax emulsion having a relatively small particle size and improved stability. It is a further object of the invention to provide a Uricury wax emulsion which may be advantageously incorporated in a self-lustering polish having properties similar to those of carnauba-containing polishes. Other objects of the invention will be in part obvious and in part pointed out hereafter. The phrase "emulsions having a relatively small particle size" as used in the present specification refers to "colloidal emulsions" as that term is defined by Ernst A. Hauser in his book "Colloidal Phenomena," 1939 edition. Such emulsions have a particle size within the range 10 to 5000 A, i. e., of colloidal dimensions.

The objects of the present invention may be attained in general by forming an oil-in-water emulsion wherein the oil phase comprises Uricury wax admixed with a petroleum hydrocarbon material. It has been found that not only does the addition of such hydrocarbons improve the emulsifying properties of the Uricury wax, but the use of the proper amount of Uricury wax results in an improvement in the emulsifiability of the hydrocarbons. In other words, it has been found that by using the proper proportions of Uricury wax and petroleum hydrocarbon material it is possible to obtain an emulsion having properties superior to those obtainable with either material alone.

In accordance with a preferred embodiment of the invention a Uricury wax emulsion is prepared containing a quantity of a petroleum hydrocarbon material such as a paraffin wax having a melting point of 142° F. I have found that when the proper quantity of this wax is included in the emulsion the stability of the emulsion is greatly improved and its viscosity and particle size are less than that of similar emulsions made without the hydrocarbon material. In some cases the particle size is so small that translucent and even transparent emulsions may be formed. Furthermore, the use of the hydrocarbon material makes it possible to employ a wider variety of emulsifying agents than may be practically used with Uricury wax alone and hence it is possible to produce emulsions having a greater diversity of properties. Also the use of such hydrocarbons decreases the cost of the emulsion.

In order to illustrate the mode of preparation and the composition of the emulsions of the present invention the following specific examples are given:

(1) 12½ grams of refined Uricury wax and

12½ grams of paraffin (M. P. 142° F.) are melted together in a suitable container. 3 grams of oleic acid and 2¼ grams of aminopropanol are added to the molten mixture at about 212° F. A solution of borax is prepared by dissolving ½ gram borax in 15 grams water and the borax solution at its boiling point is added to and mixed with the melted wax mixture. At this point the wax mixture resembles caramel in consistency. 200 grams of water are then gradually stirred into the mixture to produce a water dispersion of the wax. Initially, it is desirable to add boiling water to the mixture, but after about half of the water has been added, the remainder of the water may, if desired, be added cold. The resulting emulsion is stable for long periods of time and has an unusually small particle size.

If it is desired to use the emulsion as a polish, a dispersion of a suitable gum should be added to the emulsion. The addition of the gum dispersion improves the "laying" qualities of the emulsion i. e. causes the emulsion to spread out uniformly on a surface to which it is applied. Such a dispersion may be prepared as follows: Dissolve 12 grams of morpholine in 175 grams of water at 150–180 F. and stir 30 grams of Manila Loba C ground gum into the morpholine solution until the gum is dissolved. Strain the resulting solution and add 35 grams of the solution to the Uricury emulsion prepared as above.

The resulting emulsion may be applied to linoleum or other surfaces to be waxed in the usual manner and produce a desirable finish without rubbing or polishing. The wearing qualities of such a polish, due to its high paraffin wax content are somewhat inferior to those of an all-carnauba wax polish for floors or linoleum but for other applications where hardness or good wearing properties are of lesser importance, it is equivalent to a carnauba emulsion.

(2) The procedure of Example 1 is followed except that 6¼ gm. (25%) of paraffin (M. P. 180°) is substituted for the paraffin (M. P. 142° F.) and the quantity of refined Uricury wax is increased to 18¾ grams (75%). The emulsion produced before the addition of the gum is in this case of relatively large particle size. However, the increase in the melting point of the paraffin wax in the mixture produces a harder finish than the produce of Example 1. For this reason, the emulsion of the example is somewhat more satisfactory when incorporated in a floor polish, although for other uses where particle size is important it may be less desirable than the emulsion of Example 1.

(3) The procedure of Example 1 is followed except that 2¾ grams of diethanolamine are substituted for the aminopropanol of Example 1 and the quantity of borax used is increased to 1⅝ grams. The resulting emulsion is opaque but produces a no-rubbing polish equal to the one in Example 1 when mixed with the gum dispersion as in Example 1.

(4) The procedure of Example 1 is followed except that 13.5 grams (54%) of paraffin wax (M. P. 133° F.) is substituted for the paraffin wax (M. P. 142° F.), 115 grams of refined Uricury wax is used in place of 12.5 grams, and stearic acid is substituted for the oleic acid of Example 1.

(5) The procedure of Example 1 is followed except that 9 grams (36%) of paraffin (M. P. 160° F.) is used in place of the paraffin wax (M. P. 142° F.), 16 grams (44%) of refined Uricury wax is used and linseed oil fatty acids are used in place of the oleic acid.

(6) The procedure of Example 1 is followed except that the borax is omitted. The omission of the borax produces an emulsion having almost identical properties as with the borax except in two minor respects: Particle size is somewhat larger and the emulsion is thicker at the caramel stage, a condition, in factory production, that should be avoided.

(7) The procedure of Example 1 is followed except that ¾ gram of caustic soda is added in place of the borax. The resulting emulsion prior to addition of the gum is clear and transparent.

(8) The procedure of Example 1 is used except that only 2.5 grams of Uricury wax is used and is mixed with 22.5 grams of kerosene. The resulting emulsion may be used as a base for an agricultural or cattle spray and is superior in stability and particle size to a kerosene emulsion in which no Uricury wax is incorporated. The emulsion adheres more effectively to the sprayed surface because of its wax content.

The foregoing examples are intended to be illustrative only and it will be apparent to those skilled in the art that other materials may be substituted for those set forth in the examples. As the examples indicate, the petroleum hydrocarbon material may be either solid or liquid. In addition to the paraffin waxes and kerosene material in the specific examples, lubricating oils, gas oils, naphtha and other petroleum derivatives may be used. Other hydrocarbon materials having molecular structures similar to those of the petroleum derivatives mentioned above may likewise be used.

I have found that emulsions of minimum particle size and maximum stability are obtained in each of the above examples when a given quantity of the particular hydrocarbon material is used, the optimum quantity indicated being proportional to the molecular weight of the hydrocarbon material. However, the range of composition of useful emulsions extends some distance above and below this value. The magnitude of the effective range of compositions apparently also varies with the molecular weight of the hydrocarbon material. For the higher molecular weights the range is relatively narrow whereas for the lower molecular weights the range is relatively wide.

In the case of solid paraffin waxes having melting points of say 130° F. to 150° F. the effective concentration range appears to be from about 40% to about 60% of the hydrocarbon material. The lower limit is not critical but as the paraffin wax concentration is reduced much below 35% the advantage of adding the hydrocarbon material becomes relatively slight. As the concentration of the hydrocarbon material is increased above 60% the particle size of the resulting emulsion decreases correspondingly. The emulsion takes on a whitish color and it remains stable for only a few hours. At higher hydrocarbon concentrations no stable emulsion is formed at all.

When the higher melting point paraffins (160° F.–180° F.) are used the upper effective concentration limit is lower. The particle size starts to increase rapidly somewhere between 35 and 45%. In the case of the lower molecular weight hydrocarbons, on the other hand, the upper limit is much higher. Thus when a liquid mixture comprising hydrocarbons having from 19 to 28 carbon atoms, such as, for example, the material sold under the trade name "Nujole," is used stable emulsions are obtained containing up to 50% or 65% of the hydrocarbon material. When kerosene is used there is a reduction in particle size up to about 90% and thereafter the particle size increases rapidly. The upper effective limit is in this case about 95%. Kerosene alone does not give a stable emulsion when emulsified as above.

It has been found that the relationship between the weighted average molecular weight of the hydrocarbon material derived from petroleum and the percentage of such hydrocarbon in the Uricury-hydrocarbon mixture which gives emulsions of minimum particle size may be roughly represented by the following equation:

$$P = 120 - 0.2M$$

wherein $M$=the average molecular weight of hydrocarbon material weighted in accordance with the proportions of the pure chemical compounds present in the material and $P$=the percentage of hydrocarbon material in the Uricury-hydrocarbon mixture. The above equation is purely empirical and is disclosed merely to provide an indication as to the relative proportions of wax and hydrocarbon material that will give emulsions of minimum particle size. It has been found that in most cases the equation is accurate to within about plus or minus 10%.

It should be noted that the above equation relates only to minimum particle size. The relative proportions of wax and hydrocarbon which produce useful emulsions may depart considerably from values indicated by the equation.

In addition to the advantages previously mentioned, a number of other advantages accrue from the use of the petroleum hydrocarbon material of the present invention. For example, due to the fact that hydrocarbon compounds of various physical and chemical properties may be employed, it becomes possible to modify the properties of the resulting useful emulsions and at the same time not impair their apparent viscosity, particle size or stability. As pointed out above, various emulsifying agents may be used. Although aminopropanol is my preferred emulsifying agent, such alkaline agents as morpholine and the ethanolamines may be used, as well as the alkali metal hydroxides or any mixtures of these with each other or with borax. When morpholine is used, a relatively water-proof emulsion may be obtained because the morpholine evaporates leaving behind a difficultly emulsifiable film. Morpholine could not be used with satisfactory results in a self-lustering polish using Uricury wax if the hydrocarbon material were not added.

The hydrocarbon material also makes it possible to reduce the proportion of fatty acid in the emulsion. Hence when the emulsion is incorporated in a self-lustering polish, a harder film is produced. The use of the hydrocarbon material also results in certain manufacturing advantages in that the mixture is easier to handle in the melting kettle and less agitation is required to form the emulsion.

The use of the combination of materials in the oil phase also makes it possible to vary the particle size of the emulsions by adjusting the percentages of the two components within certain limits. Thus the particle size of an emulsion of the wax and any given hydrocarbon material may be increased by varying the percentage of hydrocarbon in the oil phase on either side of the value established for minimum particle size in the above equation. The concentration of hydrocarbon materials may be varied for any particular purpose or need and a stable emulsion will be provided, although the particle size may be considerably larger than the minimum indicated by the equation.

Since many embodiments might be made of the present invention and since many changes might be made in the embodiment here described, it is to be understood that the above description is to be interpreted as illustrative only and not in a limiting sense.

I claim:

1. A Uricury wax emulsion of the oil-in-water type having particles of colloidal dimensions and persistent stability comprising a water dispersion of a mixture of Uricury wax and petroleum hydrocarbon material, and a water-soluble emulsifying agent, the percentage of hydrocarbon material in said wax-hydrocarbon mixture being such as to saisfy within about plus or minus 10 per cent the following equation:

$$P = 120 - 0.2M$$

where $M$=the weighted average molecular weight of the hydrocarbon material and $P$=the percentage of the hydrocarbon material in the wax-hydrocarbon mixture.

2. A Uricury wax emulsion of the oil-in-water type having particles of colloidal dimensions and persistent stability comprising an aqueous dispersion of a mixture of Uricury wax and paraffin with a melting point of the order of 130° F. to 140° F., and a water-soluble emulsifying agent, said Uricury-paraffin mixture containing from about 35% to 55% by weight of said paraffin.

3. A Uricury wax emulsion of the oil-in-water type having particles of colloidal dimensions and persistent stability comprising an aqueous dispersion of a mixture of Uricury wax and a white mineral oil, and a water-soluble emulsifying agent, said Uricury-mineral oil mixture containing from about 45% to about 65% by weight of said mineral oil.

4. A Uricury wax emulsion of the oil-in-water type having particles of colloidal dimensions and persistent stability comprising an aqueous dispersion of a mixture of Uricury wax and kerosene, and a water-soluble emulsifying agent, said Uricury-kerosene mixture containing from about 75% to about 95% by weight of kerosene.

5. A Uricury wax emulsion of the oil-in-water type having particles of colloidal dimensions and persistent stability comprising an aqueous dispersion of a mixture of Uricury wax and paraffin containing approximately equal quantities of Uricury wax and paraffin, and a water-soluble emulsifying agent.

LEON M. PRINCE, Jr.

REFERENCES CITED

The following references are of record in the file of this patent:

UNITED STATES PATENTS

| Number | Name | Date |
| --- | --- | --- |
| 1,943,468 | Bridgeman | Jan. 16, 1934 |
| 1,986,936 | Lewers | Jan. 8, 1935 |
| 2,150,284 | MacRill | Mar. 14, 1939 |
| 2,288,351 | Griffith | June 30, 1942 |
| 2,374,414 | Cartwright | Apr. 24, 1945 |
| 2,374,474 | Dolian | Apr. 24, 1945 |

OTHER REFERENCES

Practical Emulsions, by H. Bennett (1943), pages 115 and 445.